US012683447B2

(12) United States Patent
Chen

(10) Patent No.: US 12,683,447 B2
(45) Date of Patent: Jul. 14, 2026

(54) COOLING STRUCTURE OF A ROTOR FOR AN AXIAL FLUX MOTOR

(71) Applicant: Yea-Huey Horng, Taichung City (TW)

(72) Inventor: Xiu-Feng Chen, Taichung City (TW)

(73) Assignee: Yea-Huey Horng, Taichung City (TW)

( * ) Notice: Subject to any disclaimer, the term of this patent is extended or adjusted under 35 U.S.C. 154(b) by 185 days.

(21) Appl. No.: 18/664,380

(22) Filed: May 15, 2024

(65) Prior Publication Data

US 2025/0357809 A1      Nov. 20, 2025

(51) Int. Cl.
H02K 1/32        (2006.01)
H02K 1/2795     (2022.01)
H02K 21/24      (2006.01)

(52) U.S. Cl.
CPC ............. H02K 1/32 (2013.01); H02K 1/2795 (2022.01); H02K 21/24 (2013.01)

(58) Field of Classification Search
CPC ........ H02K 16/04; H02K 1/32; H02K 1/2795; H02K 21/24
USPC .......................................................... 310/61
See application file for complete search history.

(56) References Cited

FOREIGN PATENT DOCUMENTS

EP          4325694 A1 *   2/2024   ........... H02K 1/2796

* cited by examiner

*Primary Examiner* — Christopher M Koehler
*Assistant Examiner* — Viswanathan Subramanian
(74) *Attorney, Agent, or Firm* — LANWAY IPR SERVICES; Chun-Ming Shih

(57)                ABSTRACT

A rotator for an axial flux motor contains: a core and two permanent magnets located on two end surfaces of the core. The core includes two circular grooves defined on the two end surfaces of the core, two flanges formed on two centers of the two end surfaces of the core, and a peripheral fence formed on an outer wall of the core, multiple passing slots radially formed on the two end surfaces of the core and passing through the core, and multiple through orifices defined around the peripheral fence and communicated with the multiple passing slots. A respective one permanent magnet of the two permanent magnets is circular and includes multiple N poles and multiple S poles. The two permanent magnets are fitted in the two circular grooves of the core and are magnetically attracted on the core.

1 Claim, 7 Drawing Sheets

COOLING STRUCTURE OF A ROTOR FOR AN AXIAL FLUX MOTOR

TECHNICAL FIELD

The present invention relates to a rotator of a motor, and more particularly to a rotator for an axial flux motor which is capable of enhancing a magnetic field strength of permanent magnets, thus enhancing a torque of the motor greatly.

BACKGROUND

Axial flux motors have the advantages of small axial size and reduced weight, and can increase torque and high power output. They are especially suitable for applications in aircraft, wind power generation, electric vehicles, motorcycles and other equipment. Since the small axial size of the motor, the heat dissipation effect is poor. Furthermore, the structure of the rotor is configured to arrange permanent magnets in an annular shape on the surface of the magnetically conductive rotor core with N and S poles spaced apart, and correspond to the coil windings of the stator. The coil windings of the stator generate axial magnetic flux to rotate the rotor, which interacts with the permanent magnets of the rotor to cause the rotor to generate torque and continuous rotation.

When the motor's coil winding rotates the rotor at high speed, it is accompanied by high temperature. The high temperature is usually caused by the iron loss generated by the silicon steel sheets in the coil winding, the copper loss of the coil winding itself, and the eddy current loss of the magnet, especially It is difficult to dissipate heat inside an axial flux motor with a small axial volume, and there is no space to install a forced convection structure. The heat can only be transferred to the motor casing by thermal conduction, and it is easy to accumulate inside the motor, so the inside is very stuffy. Once the temperature of the motor exceeds 150° C., the density of the magnetic field lines of the permanent magnets will collapse, thus affecting the insulation performance inside the motor and the service life of the bearings.

The surface of the rotor core of the axial flux motor is annular and the N and S poles are spaced with permanent magnets. Most of the permanent magnets are glued to the surface of the rotor core. The requirements for motor speed are getting higher and higher. When rotating at high speed, environment, and in a high-temperature environment, once the adhesive loses its adhesive function, the permanent magnet will fall off, thus causing the motor efficiency to decrease or even become disabled. In addition, the permanent magnets attached to the surface of the rotor core are mainly in an annular shape with N and S poles spaced apart. The main magnetic flow direction is the coil windings arranged corresponding to the stator, facing the flow direction. However, the permanent magnets are adhered to the surface of the rotor core. By using the conduction of the rotor core, part of the magnetic current flows between the N and S poles of the permanent magnets will result in a decrease in the magnetic flux density between the permanent magnets and the coil windings will decrease, thus decreasing the torque of the motor.

Please refer to FIG. 7. The axial flux motor 50 as used comprises a stator 51 and a rotor core 52. On one side surface of the stator 51, coils 511 are arranged in a ring shape. Corresponding to the coils 511 on the side surface of the stator 51, the rotor core 52 is provided with a plurality of corresponding permanent magnets 521. The permanent magnets 521 are adhered to the rotor core 52, thus creating gaps between adjacent permanent magnets 521 of different polarities. These gaps allow magnetic flux to be conducted by the rotor core 52, thereby reducing the axial magnetic flux and leading to a decrease in magnetic flux density between the permanent magnets 521 and the coils 511. Furthermore, the axial volume of the motor is small, and there is no structure for forced convection installed. Heat easily accumulates inside the motor, causing a decrease in magnetic flux density of the permanent magnets, thereby affecting the insulation performance and the service life of the bearings inside the motor.

SUMMARY

The primary aspect of the present invention is to provide a rotator for an axial flux motor by which the core includes the multiple passing slots to stop the magnetic lines of force of the two permanent magnets, thus avoiding the eddy current loss of the two permanent magnets, the ineffective magnetic field lines. The magnetic force lines with strong magnetic attraction are generated between the two permanent magnets of the core to produce the stronger torque and enhance efficiency of the motor. In addition, the multiple passing slots are configured to dissipate the heat quickly and to conduct the heat outstandingly from the interior of the core.

To obtain above-mentioned aspect, a rotator for an axial flux motor provided by the present invention contains: a core and two permanent magnets located on two end surfaces of the core.

The core includes two circular grooves defined on the two end surfaces of the core, two flanges formed on two centers of the two end surfaces of the core, and a peripheral fence formed on an outer wall of the core, multiple passing slots radially formed on the two end surfaces of the core, and multiple through orifices defined around the peripheral fence and communicated with the multiple passing slots.

A respective one permanent magnet of the two permanent magnets is circular and includes multiple N poles and multiple S poles, wherein the two permanent magnets are fitted in the two circular grooves of the core and are magnetically attracted on the core. The two permanent magnets are magnetically attracted on the core.

DETAILED DESCRIPTION

Figure 1:
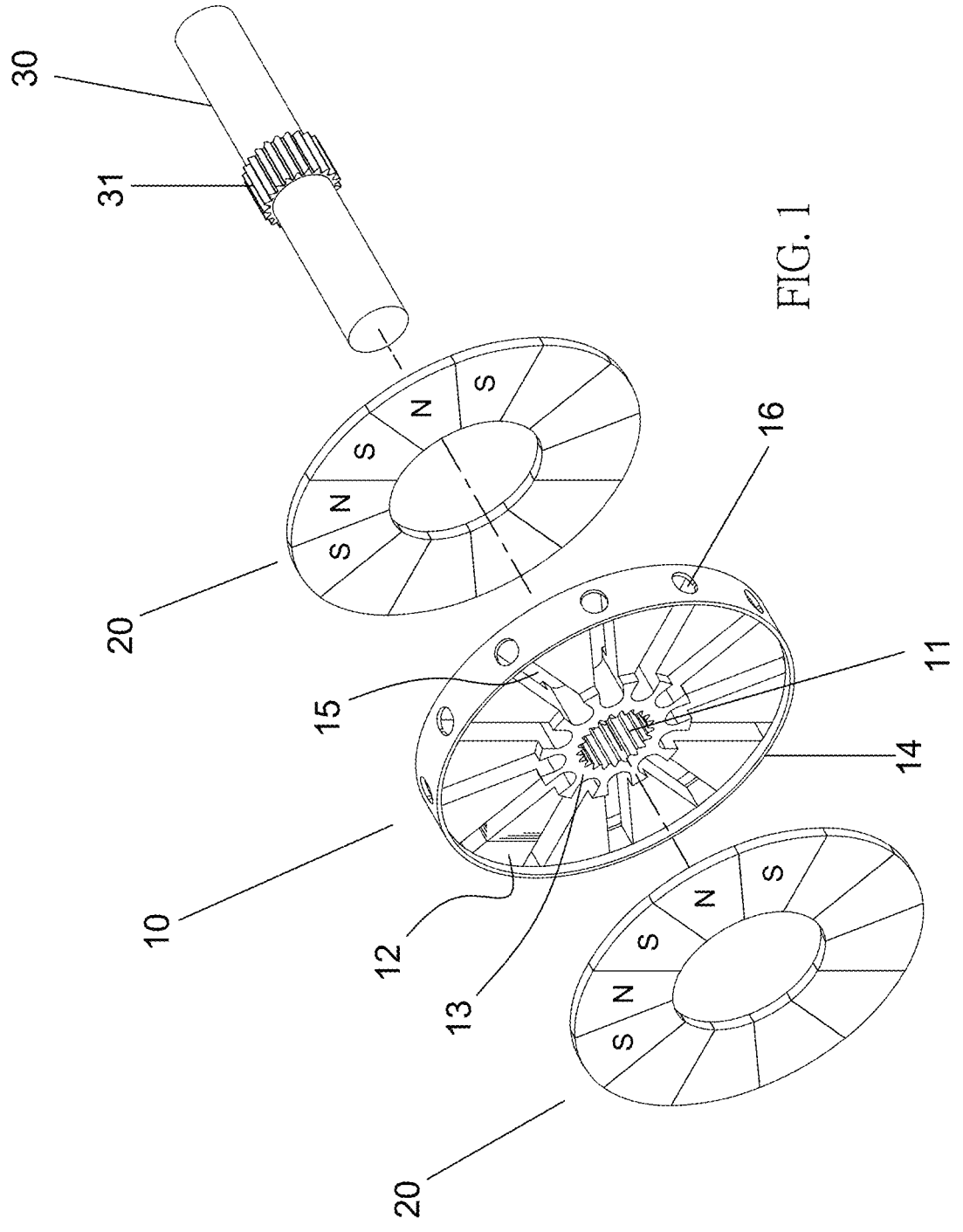
FIG. 1 is a perspective view showing the exploded components of a rotator for an axial flux motor according to a preferred embodiment of the present invention.
Figure 2:
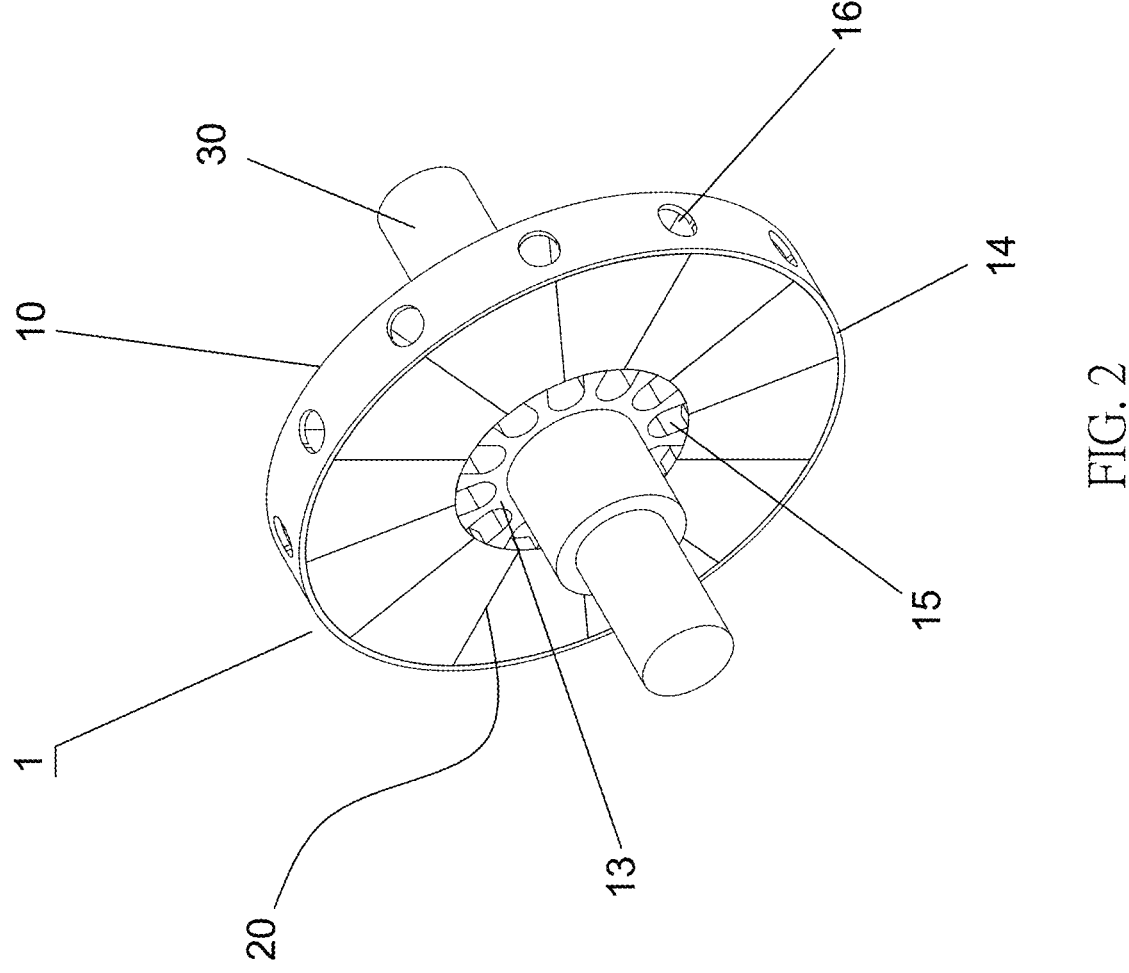
FIG. 2 is a perspective view showing the assembly of the rotator for the axial flux motor according to the preferred embodiment of the present invention.
Figure 3:
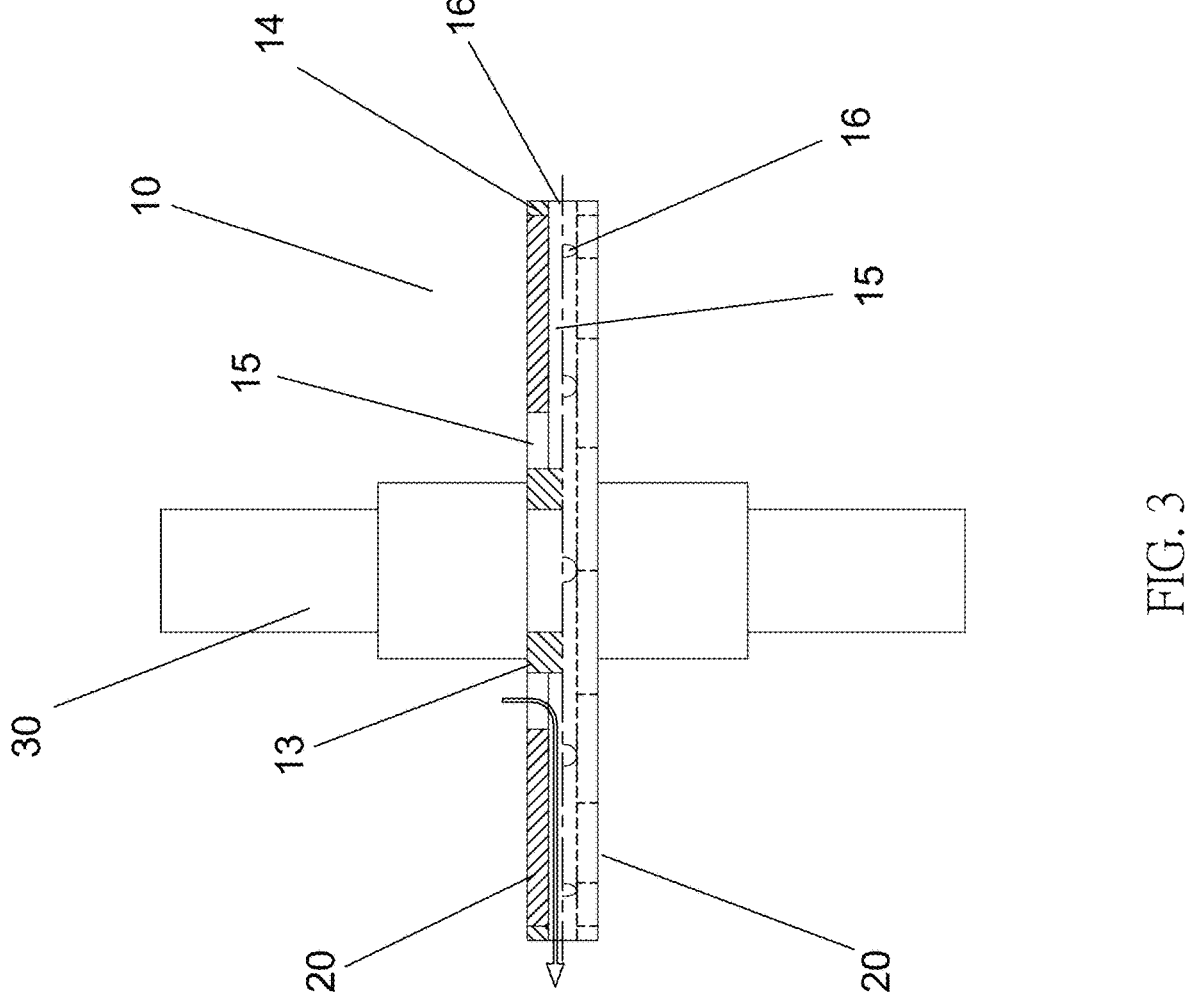
FIG. 3 is a cross sectional view showing the assembly of the rotator for the axial flux motor according to the preferred embodiment of the present invention.

With reference to FIGS. 1-3, a rotator 1 for an axial flux motor according to a preferred embodiment of the present invention comprises: a core 10 and two permanent magnets 20.

The core 10 includes an aperture 11 defined on a center thereof and connected with a connection stem 31 of a motor shaft 30, two circular grooves 12 defined on two end surfaces of the core 10, two flanges 13 formed on two centers of the two end surfaces of the core 10, and a peripheral fence 14 formed on an outer wall of the core 10, multiple passing slots 15 radially formed on the two end surfaces of the core 10 and passing through the core 10, wherein a length of the multiple passing slots 15 is defined among the two flanges 13 and the peripheral fence 14, and the core 10 further includes multiple through orifices 16 defined around the peripheral fence 14 and communicated with the multiple passing slots 15.

A respective one permanent magnet 20 of the two permanent magnets 20 is circular and includes multiple N poles and multiple S poles, wherein a respective one N pole of the multiple N poles is defined between any two adjacent S poles of the multiple S poles, wherein the two permanent magnets 20 are fitted in the two circular grooves 12 of the core 10 and are magnetically attracted on the core 10.

Referring to FIGS. 1 and 2, the two permanent magnets 20 are fitted in the two circular grooves 12 of the core 10 to cover the multiple passing slots 15 of the core 10. As shown in FIG. 3, the multiple passing slots 15 are a channel so that when the core 10 rotates to produce a centrifugal force, hot airs discharge out of multiple through orifices 16 via the two flanges 13 of the multiple passing slots 15 and the two permanent magnets 20 from an interior of the core 10, as indicated by an arrow of FIG. 3, thus dissipating heat quickly. In other words, the heat is dissipated from the interior of the core 10 to conduct the heat and avoiding a high heat accumulating in a motor.

Figure 4:
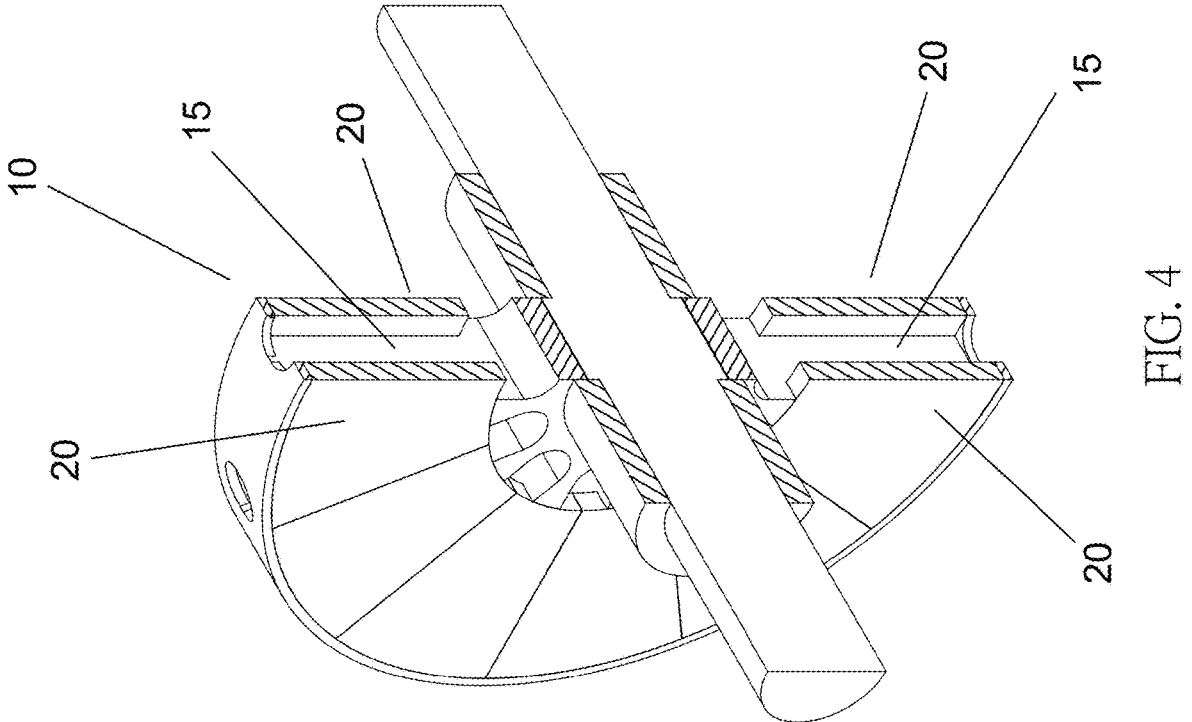
FIG. 4 is a cross-sectional perspective view showing the assembly of a part of the rotator for the axial flux motor according to the preferred embodiment of the present invention.
Figure 5:
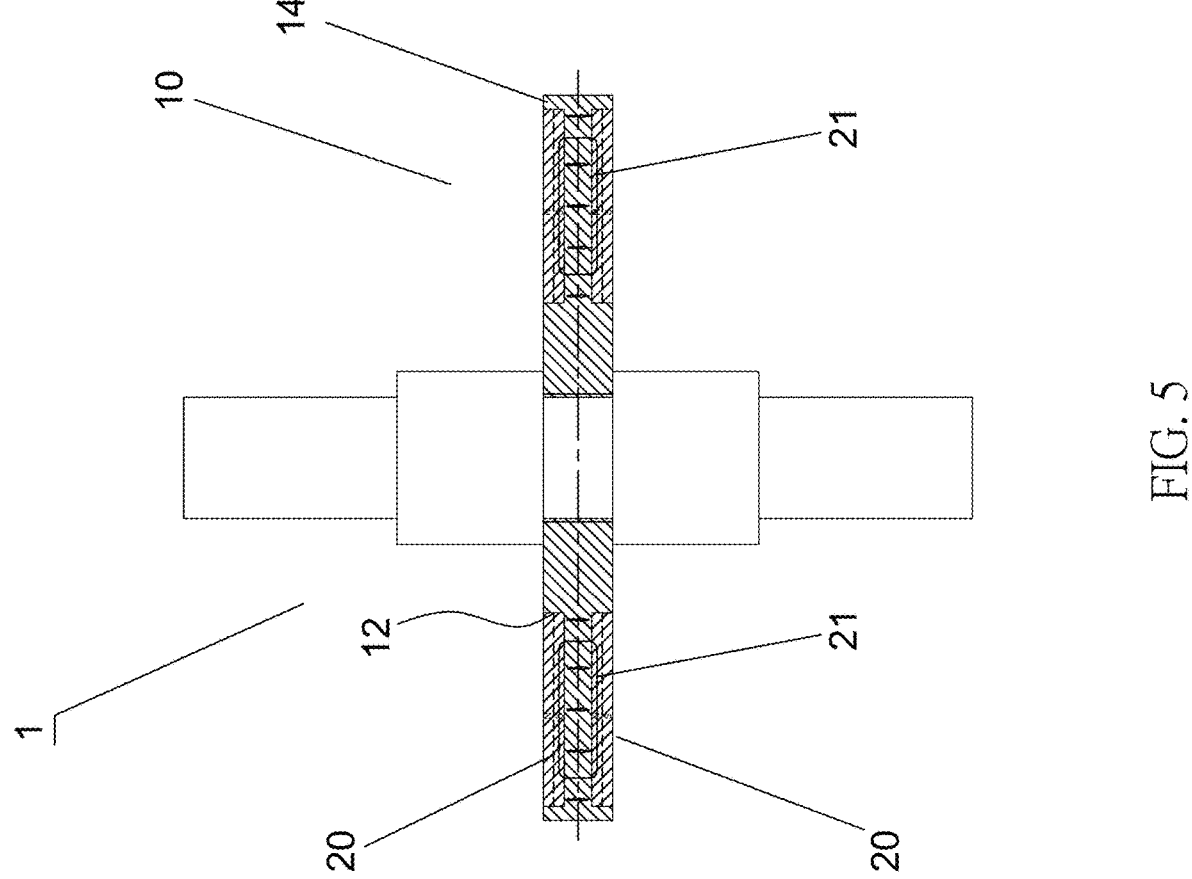
FIG. 5 is a cross sectional view showing the operation of the rotator for the axial flux motor according to the preferred embodiment of the present invention.

The core 10 includes the multiple passing slots 15 to dissipate the heat quickly and to stop producing magnetic lines of force of the two permanent magnets 20. Preferably, ineffective magnetic field lines are formed between two adjacent and different polarities, which increases the density of effective magnetic lines, thus improving an efficiency of the motor. As shown in FIGS. 1 and 4, the respective one permanent magnet includes the multiple N poles and multiple S poles, wherein the respective one N pole is defined between any two adjacent S poles, its magnetic induction direction is mainly related to the direction of the plane. The two permanent magnets 20 are fitted in the two circular grooves 12 of the core 10 and are magnetically attracted on the core 10. When the two permanent magnets 20 contact with the two circular grooves 12, an adjacent boundary positions of N poles and S poles that are spaced and adjacently distributed are located above the multiple passing slots 15 (as shown in FIG. 4), no a magnetic conductor between the adjacent N poles and S poles is formed opposite S poles and N poles, so it is impossible to generate magnetic lines of force between the N poles and S poles, thus reducing an eddy current loss, a heat generation, and ineffective magnetic lines of force of the two permanent magnets 20. Magnetic force lines 21 with strong magnetic attraction are generated between the two permanent magnets 20, as illustrated in FIG. 5 so that the two permanent magnets 20 attract on the core 10 securely.

With reference to FIGS. 1, 2 and 4, the two permanent magnets 20 are fitted in the two circular grooves 12 of the core 10 and are magnetically attracted on the core 10, and the two permanent magnets 20 are limited by the peripheral fence 14 of the core 10, such that the two permanent magnets 20 are limited in the two circular grooves 12, when the core 10 rotates in a high speed to avoid a removal. Preferably, a rigidity of the core 10 is enhanced by using the peripheral fence to obtain an outstanding rigidity of the core 10 when the core 10 rotates in the high speed and temperature, thus operating the rotor 1 normally.

Figure 6:
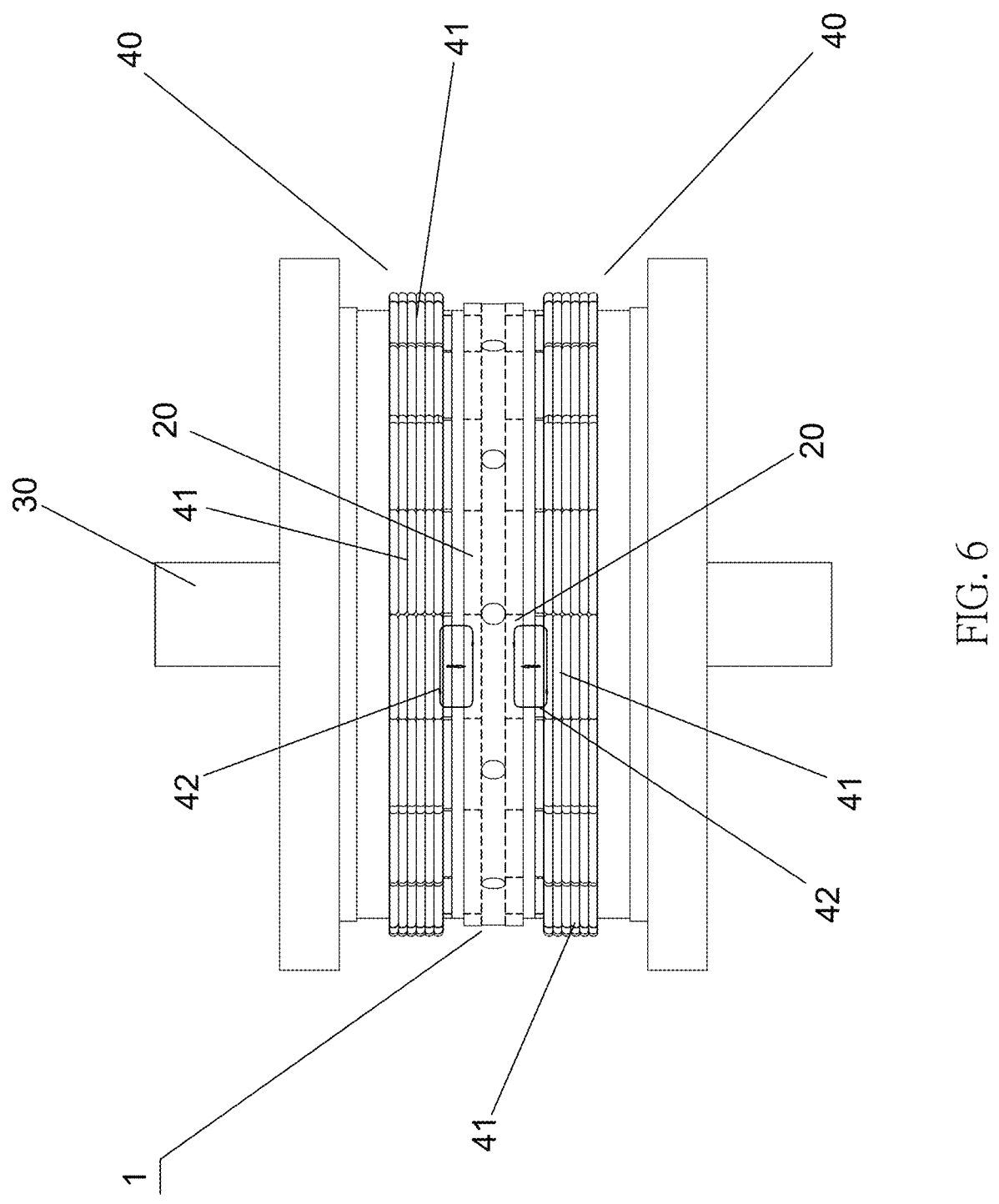
FIG. 6 is a schematic view showing the application of the rotator for the axial flux motor according to the preferred embodiment of the present invention.
Figure 7:
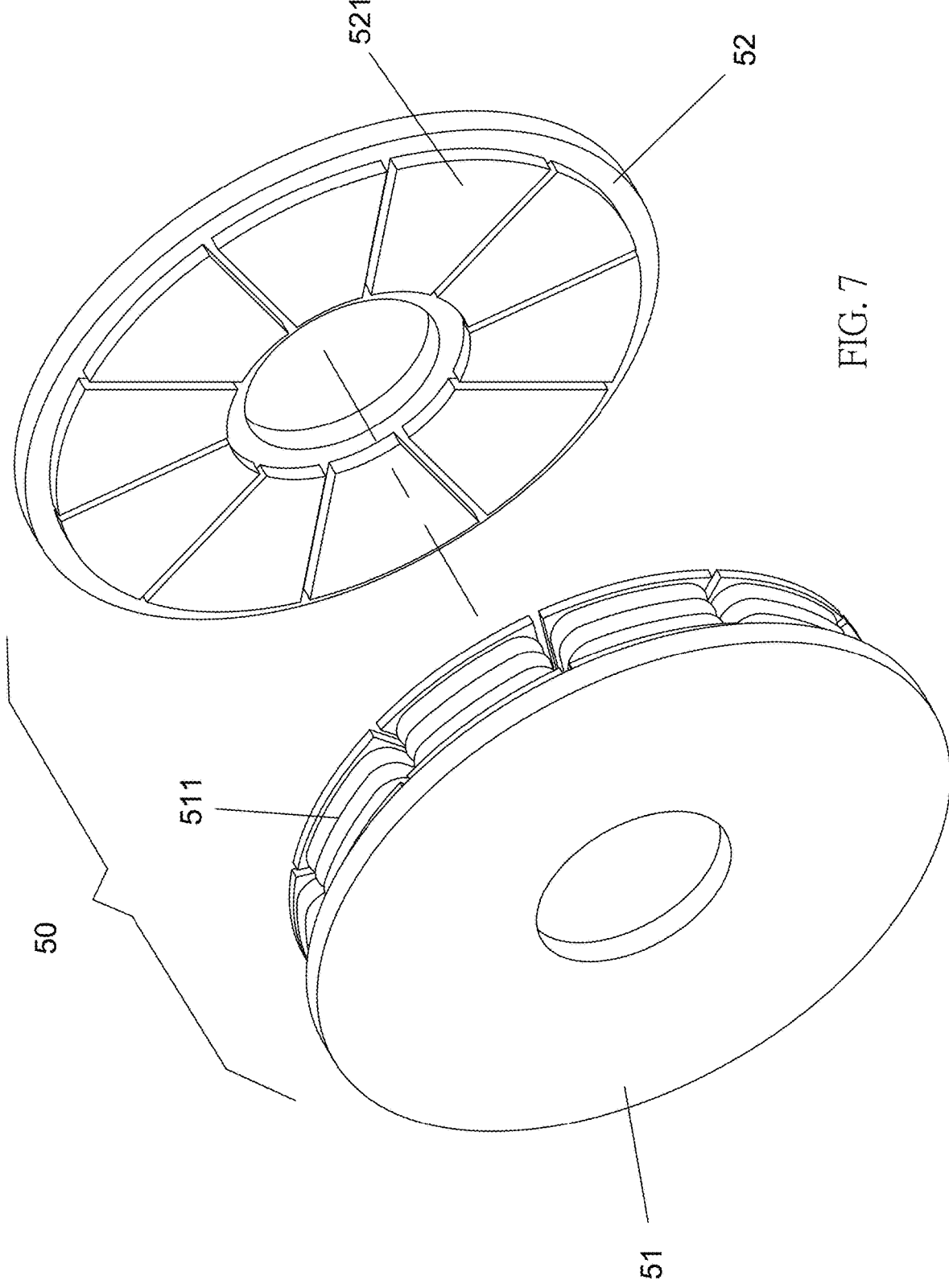
FIG. 7 is a Three-dimensional system diagram of an axial flux motor in use.

FIG. 6 is a schematics view showing the assembly of the rotor 1 and two stators 40 according the preferred embodiment of the present invention. The rotor 1 is connected with the motor shaft 30, wherein the two permanent magnets 20 of the rotor 1 correspond to two coils 41 of the two stators 40. When electric currents fluxes with the two coils 41, a circuit produces among a respective one coil 41 and a magnetic line 42 of force of a respective one permanent magnet 20 corresponding to the respective one coil 41, hence a continuous change of a polarity of the respective one coil 41 corresponds to a polarity of the respective one permanent magnet 20 to push the core 10 to rotate. As illustrated in FIG. 4, the core 10 includes the multiple passing slots 15, wherein when the multiple passing slots 15 contact with the two permanent magnets 20, the magnetic lines of force of the two permanent magnets are stopped, thus reducing the eddy current loss, the heat generation, and the ineffective magnetic lines of force of the two permanent magnets 20. Referring to FIG. 5, the magnetic force lines 21 with strong magnetic attraction are generated between the two permanent magnets 20 of the core 10. Preferably, the two coils 41 of two stators 40 produce a stronger torque to enhance efficiency of the motor.

Thereby, the core of the present invention includes the multiple passing slots to stop the magnetic lines of force of the two permanent magnets, thus avoiding the eddy current loss of the two permanent magnets, the ineffective magnetic field lines. The magnetic force lines with strong magnetic attraction are generated between the two permanent magnets of the core 10 to produce the stronger torque and enhance efficiency of the motor. In addition, the multiple passing slots are configured to dissipate the heat quickly and to conduct the heat outstandingly from the interior of the core.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A cooling structure of a rotor for an axial flux motor, comprising:

a core and two permanent magnets located on two end surfaces of the core;

wherein the core includes two circular grooves defined on the two end surfaces of the core, two flanges formed on centers of the two end surfaces of the core, and a peripheral fence formed on an outer wall of the core;

wherein multiple passing slots pass through the core between the two flanges and the peripheral fence;

wherein a length of the multiple passing slots is defined between the two flanges and the peripheral fence;

wherein the multiple passing slots extend through the core;

wherein multiple through holes are defined on the peripheral fence and communicate with the multiple passing slots;

wherein each of the two permanent magnets is circular and includes multiple N poles and multiple S poles;

wherein the two permanent magnets are fitted into the two circular grooves on two sides of the core and are magnetically attracted to the core;

wherein the annularly arranged passing slots on the two side surfaces of the core are covered by the two permanent magnets such that each passing slot forms a channel.

* * * * *